United States Patent
Oda et al.

(10) Patent No.: US 8,992,381 B1
(45) Date of Patent: Mar. 31, 2015

(54) CONTROL DEVICE FOR VEHICLE

(71) Applicants: Aisin Seiki Kabushiki Kaisha, Kariya-shi (JP); Aisin Technical Center of America, Inc., Plymouth, MI (US)

(72) Inventors: Naochika Oda, Nagoya (JP); Tomohiro Nagato, Obu (JP); Jesse O'Neill, Novi, MI (US)

(73) Assignees: Aisin Seiki Kabushiki Kaisha, Kariya-shi (JP); Aisin Technical Center of America, Inc., Plymouth, MI (US)

( * ) Notice: Subject to any disclaimer, the term of this patent is extended or adjusted under 35 U.S.C. 154(b) by 1 day.

(21) Appl. No.: 14/056,414

(22) Filed: Oct. 17, 2013

(51) Int. Cl.
  *B60W 10/04* (2006.01)
  *B60W 10/10* (2012.01)
  *B60W 10/11* (2012.01)
  *B60W 10/06* (2006.01)

(52) U.S. Cl.
  CPC ............... *B60W 10/11* (2013.01); *B60W 10/06* (2013.01); *B60W 2510/0657* (2013.01)
  USPC ......................................................... 477/115

(58) Field of Classification Search
  CPC ............ F16H 61/0213; F16H 61/0293; F16H 61/0248; F16H 59/48; B60W 10/06; B60W 10/11; B60W 10/02; B60W 30/18
  USPC ....................... 477/115, 120, 121; 701/51, 52
  See application file for complete search history.

(56) References Cited

U.S. PATENT DOCUMENTS

| 2008/0221760 | A1* | 9/2008 | Wakamatsu et al. | 701/52 |
| 2010/0049411 | A1* | 2/2010 | Matsunaga et al. | 701/52 |
| 2010/0168969 | A1* | 7/2010 | Inagaki et al. | 701/55 |
| 2011/0239801 | A1* | 10/2011 | Inagaki et al. | 74/473.1 |

FOREIGN PATENT DOCUMENTS

| JP | 5-231533 | 9/1993 |
| JP | 2002-227995 | 8/2002 |
| JP | 2012-163128 | 8/2012 |

* cited by examiner

*Primary Examiner* — Justin Holmes
(74) *Attorney, Agent, or Firm* — Oblon, McClelland, Maier & Neustadt, L.L.P.

(57) ABSTRACT

The control device comprises an upshifting prohibiting portion for prohibiting the upshifting of the plurality of speed change stages, an engine rotation speed maintaining portion for maintaining an engine rotation speed to a predetermined rotation speed, an engine maximum torque value recording portion for recording a maximum torque value of the engine and an upshifting prohibition releasing portion for releasing an upshifting prohibition by the upshifting prohibiting portion when a differential torque value which is a difference between the maximum torque value of the engine recorded by the engine maximum torque value recording portion and a current engine torque value is greater than a predetermined torque value when the upshifting of the plurality of speed change stages is prohibited by the upshifting prohibiting portion.

6 Claims, 7 Drawing Sheets

CONTROL DEVICE FOR VEHICLE

BACKGROUND OF THE INVENTION

This invention relates to a control device for a vehicle.

FIELD OF THE INVENTION

Discussion of the Related Art

One example of a conventional control device for a vehicle is shown in a Patent Document 1. As illustrated in FIG. 1 of the Patent Document 1, according to this conventional control device, speed change operation for a transmission of the vehicle is suspended from the time a judgment for downshifting in response to the increase of a throttle opening degree of the engine is made until a certain delay time lapsed. The delay time is determined according to the vehicle running condition by using fuzzy inference logic. After the delay time lapsed, a speed change operation is performed in response to the vehicle running condition at that time.

DOCUMENT LIST OF STATE OF ART

Patent Document

Patent Document 1: JP05 (1993)-231533 A

Figure 6:
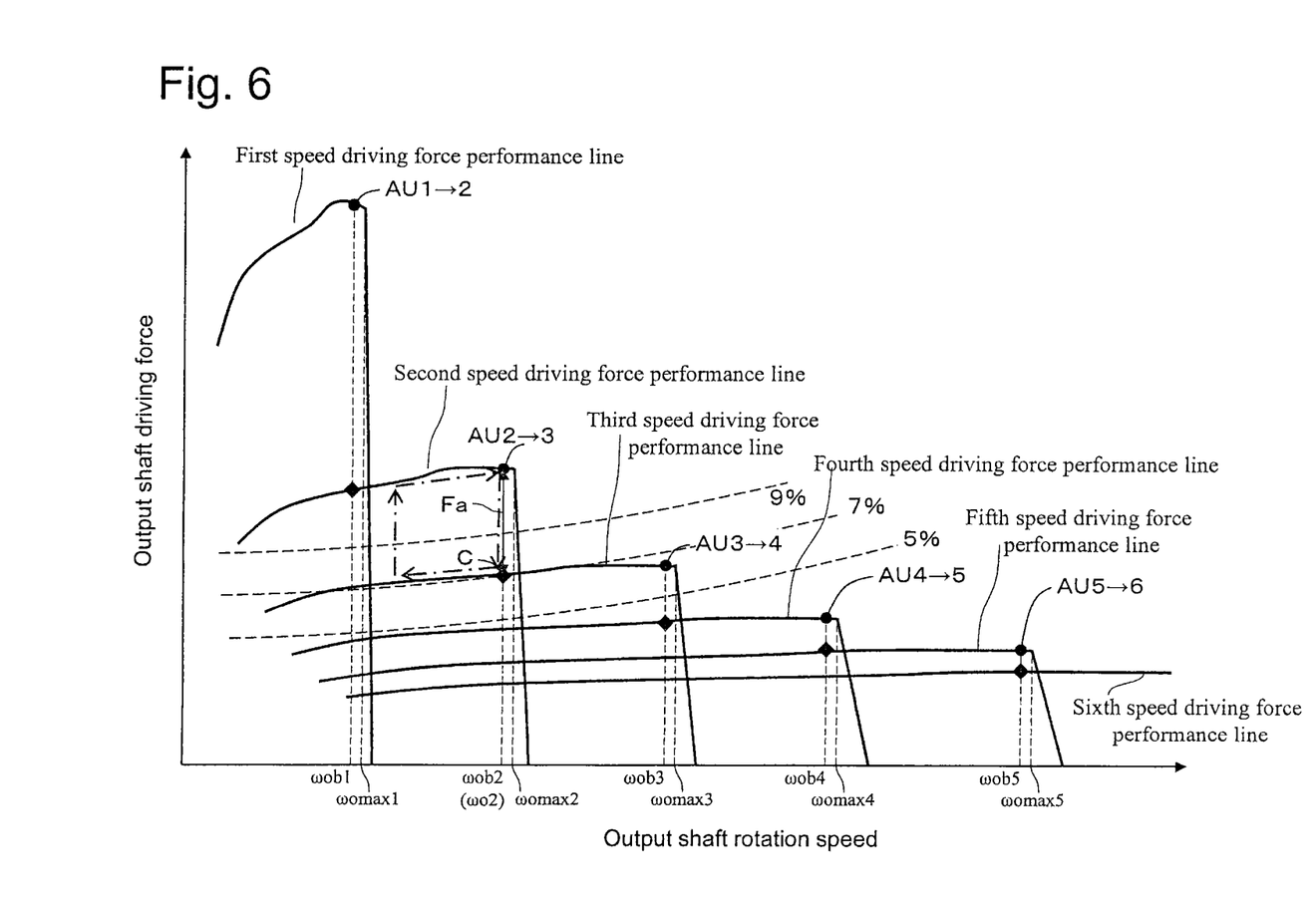
FIG. 6 is an output shaft rotation speed and output shaft driving force performance, explaining the upshifting operation during the normal mode.

However, according to the control device for a vehicle as disclosed in the Patent Document 1, after a predetermined delay time lapsed, if the vehicle is running on an uphill in full throttle by fully depressing the accelerator pedal, particularly, if the vehicle exhibits a vehicle driving characteristics (vehicle speed/driving force characteristics) as shown in FIG. 6 of the drawings attached to this application, an occurrence of a shift hunting may not be prevented. In more detail, assuming that a vehicle loaded with maximum allowable load is running on an uphill (9% inclination) at the second speed in full throttle by fully depressing the accelerator pedal, since the driving force with the second speed is greater than the running resistance (9% inclination), the vehicle is accelerated. Thereafter, in order to prevent an excess revolution (over-revolution or excessive revolution) of the engine, upshifting of the speed (change to the third speed) is performed at the vehicle speed, at which the engine excessively revolves under the second speed, immediately before a sudden decreasing of the driving force. However, since the driving force with the third speed stage is smaller than the running resistance at 9% inclination uphill road, the vehicle is decelerated. Thereafter, when the vehicle running condition satisfies a predetermined condition (for example, the vehicle is decelerated and the vehicle speed becomes a predetermined speed), the downshifting of the speed stage (change to the second speed) is performed. The repetition of up-down shifting of the transmission is called as "hunting" of the shifting.

DISCLOSURE OF THE INVENTION

The present invention was made in consideration with the above problems and the object of the invention is to provide a control device for a vehicle which can suppress occurrence of hunting phenomenon when the vehicle is running on an uphill in full throttle of the engine by fully depressing the accelerator pedal.

In order to solve the problems, the control device for a vehicle according to the invention includes an engine operated by combustion of fuel, an automatic transmission having a plurality of speed change stages for outputting an output rotation of the engine to an output shaft by changing a rotation speed thereof with a plurality of gear ratios, whereby an upshifting or a downshifting of the plurality of speed change stages is performed to increase or decrease an output rotation speed of the output shaft when one of the speed change stages is shifted to another of the speed change stages and an accelerator pedal for adjusting the output rotation of the engine, the control device comprising, an upshifting prohibiting portion for prohibiting the upshifting of the plurality of speed change stages when an opening degree of the accelerator pedal is equal to or more than a first predetermined value and an engine rotation acceleration speed is less than a second predetermined value, an engine rotation speed maintaining portion for maintaining an engine rotation speed to a predetermined engine rotation speed when the upshifting of the plurality of speed change stages is prohibited by the upshifting prohibition portion, an engine maximum torque value recording portion for recording a maximum torque value of the engine when the upshifting of the plurality of speed change stages is prohibited by the upshifting prohibition portion and an upshifting prohibition releasing portion for releasing an upshifting prohibition by the upshifting prohibiting portion when a differential torque value which is a difference between the maximum torque value of the engine recorded by the engine maximum torque value recording portion and a current engine torque value is greater than a predetermined torque value when the upshifting of the plurality of speed change stages is prohibited by the upshifting prohibiting portion.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

THE EMBODIMENTS FOR IMPLEMENTING THE INVENTION

Figure 1:
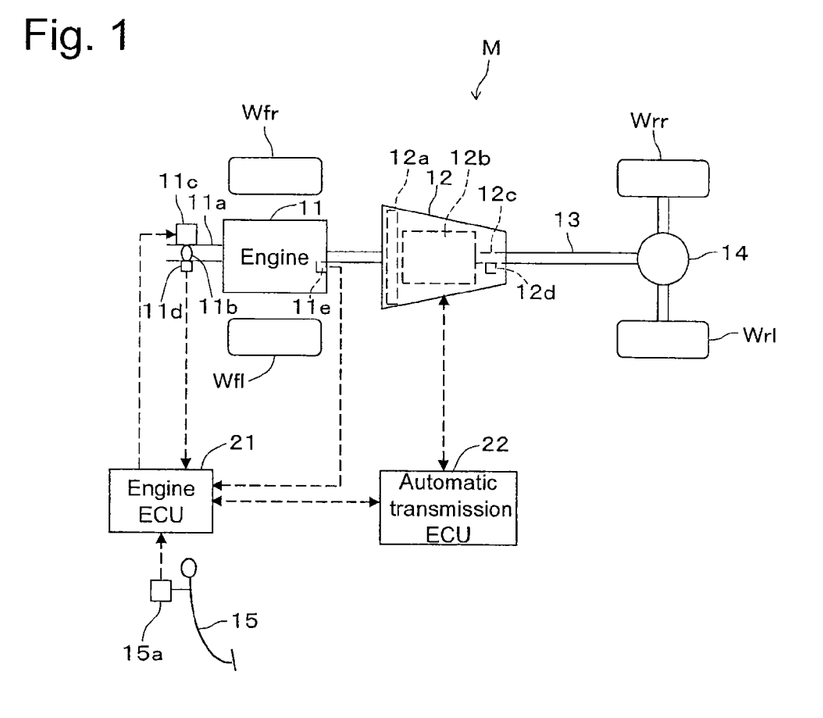
FIG. 1 is a block view showing a control device for a vehicle according to an embodiment of the invention.

A control device for a vehicle according to a first embodiment of the invention will be explained with reference to the attached drawings. FIG. 1 shows a vehicle to which the control device of the present invention is applied. The vehicle M includes an engine 11, an automatic transmission 12, a propeller shaft 13, a differential device 14, drive wheels Wrl and Wrr (rear left wheel Wrl and rear right wheel Wrr) and driven wheels or steered wheels Wfl and Wfr (front left wheel and front right wheel Wfr).

The engine 11 is operated by fuel combustion to generate a driving force for the vehicle. The driving force of the engine 11 is structured to be transmitted to the drive wheels Wrl and Wrr via the automatic transmission 12, the propeller shaft 13 and the differential device 14. A throttle valve 11b is provided in an intake passage 11a of the engine 11. The throttle valve 11b is operated to open and close the passage 11a in response to an operating amount of an accelerator pedal 15, which will be explained later in more detail. The opening and closing operation of the throttle valve 11b is performed by a motor 11c for throttle valve upon receipt of the instructions from a later explained engine ECU (Electronic Control Unit) 21. The opening degree of the throttle valve 11b (hereinafter referred to as throttle opening) is detected by a throttle opening sensor 11d and the detected result is outputted to the engine ECU 21. Further, the engine 11 is provided with a rotation speed sensor 11e which detects the rotation speed of a crank shaft of the engine 11 (i.e., the engine rotation speed) and outputs the detected result to the engine ECU 21.

The automatic transmission 12 includes a plurality of speed change stages (in this embodiment, six forward and one reverse speeds) for outputting an output rotation of the engine to an output shaft 12c of the automatic transmission 12 by changing a rotation speed thereof at a plurality of gear ratios. The automatic transmission 12 is a type which can perform upshifting or downshifting of the plurality of speed change stages to increase or decrease an output rotation speed of the output shaft 12c when one of the speed change stages is shifted to another of the speed change stages. The structure of the automatic transmission 12 is of a standard torque converter type which includes a torque converter 12a, a planetary gear unit 12b, the output shaft 12c and a hydraulic control device (not shown). The automatic transmission 12 increases or decreases the output from the engine 11 to the output shaft 12c of the automatic transmission 12. The gear ratio is decreased with the increase of the number of the speed stage from lower to higher.

The automatic transmission 12 performs upshifting and downshifting of the speed change stage. In detail, when the opening degree of the accelerator pedal (throttle opening degree) is less than a first predetermined value A1 (for example 90%), the speed change is performed using the speed change performance line indicating the relationship between the throttle opening degree and the rotation speed of the output shaft 12c. If the opening degree of the throttle opening degree is equal to or more than the first predetermined value A1 (90%), the upshifting of the speed is performed according to the engine rotation speed. The speed change performance line includes an upshifting performance line used for upshifting and a down shifting performance line for downshifting. In this embodiment a standard automatic transmission 12 is used however, a dual clutch type transmission or an automated manual transmission (AMT) may be used as long as the speed change stage of the transmission is automatically shifted.

The output shaft 12c of the automatic transmission 12 is connected to the propeller shaft 13. An output shaft rotation speed sensor 12d is provided around the output shaft 12c for detecting the rotation speed of the output shaft 12c and outputting the detected result to an automatic transmission ECU 22, which will be explained later.

In the vehicle M, the engine 11 is electrically connected to the engine ECU 21 and the automatic transmission 12 is electrically connected to the automatic transmission ECU 22. The engine ECU 21 and the automatic transmission ECU 22 are mutually communicably connected via CAN (Controller Area Network) or the like. The engine ECU controls the engine 11 while the automatic transmission ECU controls the automatic transmission 12.

An acceleration opening degree sensor 15a is provided at the accelerator pedal 15 to detect the opening degree of the pedal 15. The acceleration opening degree sensor 15a is electrically connected to the engine ECU 21 for outputting the detected result thereto. The engine ECU 21 adjusts the throttle opening degree of the throttle valve 11b in response to the opening degree of the accelerator pedal 15. Each ECU 21 and 22 includes a CPU (Central Processing Unit) portion, a memory portion such as ROM or RAM which memorizes the programs and various maps (such as speed change performance line and output shaft rotation speed and output shaft driving force performance line, which will be later explained in detail) and an input/output interface for exchanging the information.

According to the embodiment of the invention, the control device includes only the automatic transmission ECU 22 however, the control device includes only the engine ECU 21, or includes both the automatic transmission ECU 22 and the engine ECU 21.

The automatic transmission ECU 22 memorizes the speed change performance lines for upshifting and downshifting. The speed change performance line for upshifting is used when the speed is shifted up from a low speed stage to a high speed stage, while the speed change performance line for downshifting is used when the speed is shifted down from a high speed stage to a low speed stage.

Figure 2:
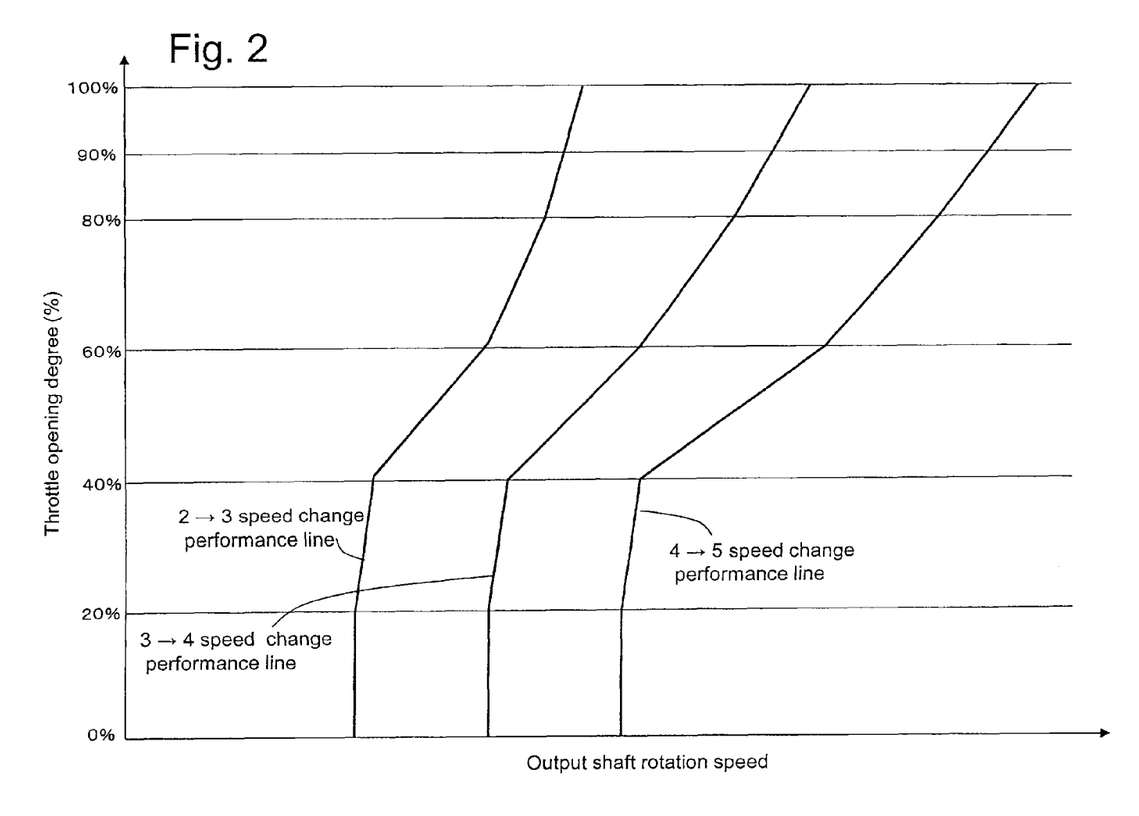
FIG. 2 shows a speed change performance line for upshifting.

FIG. 2 shows the performance lines for upshifting. In more detail, the performance lines in FIG. 2 are 2→3 speed change performance line for upshifting from the second speed to the third seed, 3→4 speed change performance line for upshifting from the third to fourth speed, 4→5 speed change performance line for upshifting from the fourth speed to the fifth speed. The output shaft rotation speed on 2→3 the speed change performance line is set to be smaller than the output shaft rotation speed on the 3→4 speed change performance line and further the output shaft rotation speed is set to be smaller than the output shaft rotation speed on the 4→5 speed change performance line. The performance lines for downshifting are similar to those of the upshifting and accordingly, the explanation thereof is omitted.

Figure 3:
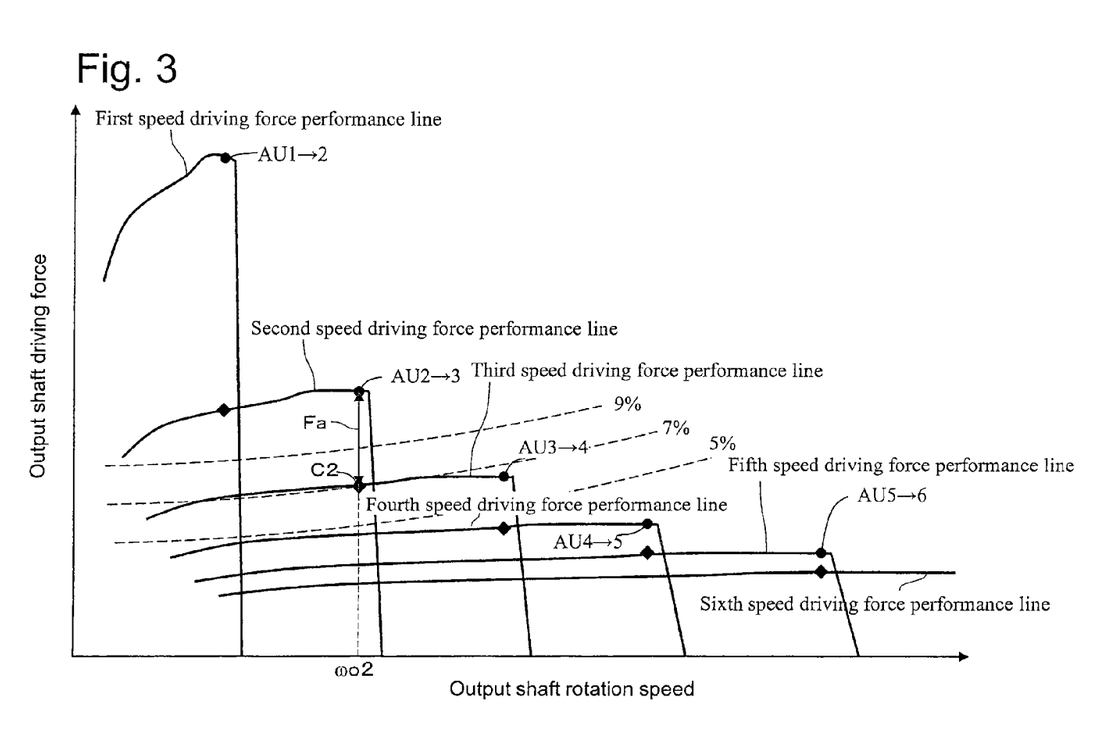
FIG. 3 shows an output shaft rotation speed and output shaft driving force performance line showing the relationship therebetween.

As shown in FIG. 3, the automatic transmission ECU 22 memorizes the relationship between the output shaft rotation speed and the output shaft driving force (output shaft rotation speed and output shaft driving force performance line) which shows one of the vehicle running performance characteristics. The output shaft rotation speed and output shaft driving force performance line includes driving force performance lines corresponding to each speed change stage. In this embodiment, six driving force performance lines are illustrated from the first to the sixth. The output shaft rotation speed and output shaft driving force performance line is set per every throttle opening degree and every output shaft rotation speed and each output shaft driving force performance line per throttle opening degree is memorized. According to the embodiment, the throttle opening degree is illustrated as the 100% open state. In FIG. 3, the horizontal axis indicates the output shaft rotation speed and the vertical axis indicates the output shaft driving force. This performance characteristic depends on each individual vehicle performance.

According to the output shaft rotation speed and output shaft driving force performance lines in FIG. 3, the driving force at each speed stage is set to be sharply decreased at a vehicle speed set corresponding to an allowable engine rotation speed. This allowable rotation speed is a limit rotation speed of the engine 11 and if such the rotation speed exceeds this limit rotation speed, the engine becomes over-revolving state and will be broken due to such excess revolution operation.

Figure 4:
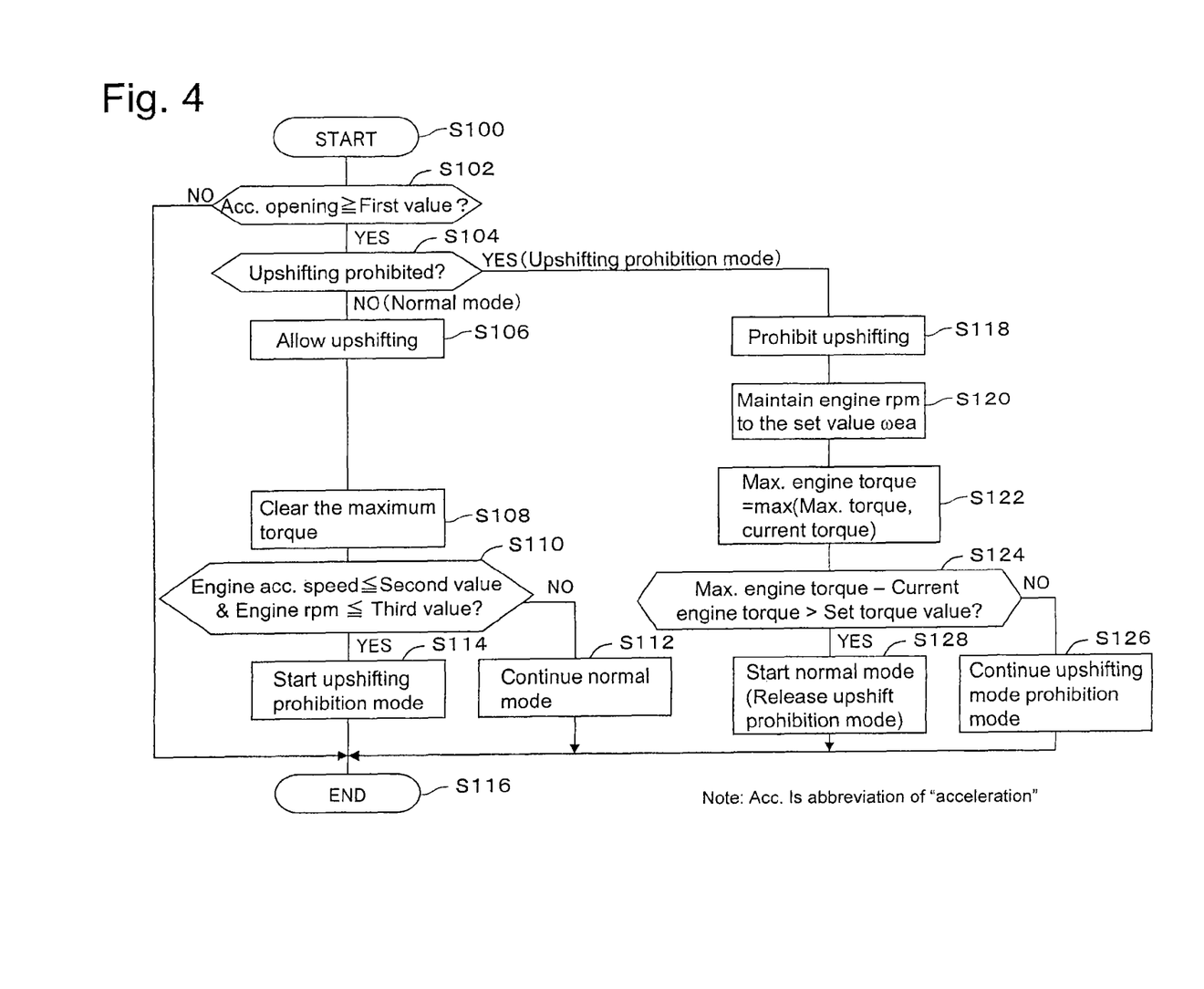
FIG. 4 is a flowchart for a control program executed by an automatic transmission ECU illustrated in FIG. 1.

Next, one example of the operation of thus structured control device for a vehicle will be explained hereinafter with reference to the flowchart in FIG. 4. When the automatic transmission ECU 22 is switched ON by a starter or an ignition switch (not shown), the program corresponding to the flowchart illustrated in FIG. 4 is repeatedly executed every predetermined short period of time. The automatic transmission ECU 22 sets the initial setting of upshifting mode to a normal mode. The normal mode allows the upshifting operation. In more detail, while the acceleration opening degree A is less than a first predetermined value A1 (later explained in detail), the upshifting and downshifting of the speed change stages for the transmission are performed based on output shaft rotation speed detected by the output shaft rotation speed sensor 12, the throttle opening degree detected by the throttle opening degree sensor 11d and along the speed change performance line for upshifting and downshifting. When the acceleration opening degree A is equal to or more than the predetermined value A1, the upshifting is performed based on the engine rotation speed detected by the rotation speed sensor 11e.

The automatic transmission ECU 22 judges whether the acceleration opening degree A detected by the acceleration opening degree sensor 15a is equal to or more than the predetermined value A1 at the step S102 every time the program starts from the step S100 in FIG. 4. The predetermined value A1 is usually determined to be a value which indicates the throttle is approximately fully opened, such as to the value of 90% of the full throttle value A. When the throttle opening degree A is judged to be less than the predetermined value A1 (NO) at the step S102, by the automatic transmission ECU 22, the program goes to the step S106 to temporarily end the program (the program loops per every short period of time).

On the other hand, when the acceleration opening degree A is judged to be equal or more than the predetermined value A1 (YES) at the step S102, then the program goes to the step S104. At the step S104, the automatic transmission ECU 22 further judges whether the current upshifting mode is normal or upshifting prohibition mode. It is noted here that the upshifting prohibition mode is a mode for prohibiting the upshifting operation of the transmission. As stated, the normal mode is a mode for allowing the upshifting operation of the transmission.

When the automatic transmission ECU 22 judges that the current upshifting mode is normal mode at the step S104 (NO) and the program goes to the step S106 and allows the upshifting operation. Then the automatic transmission ECU 22 clears the maximum engine torque amount recorded in a memory portion (not shown) at the step S108.

At the step S110, the automatic transmission ECU 22 judges whether the engine rotation acceleration speed $\alpha e$ is equal to or less than a second predetermined value $\alpha e1$ and at the same time the engine rotation speed $\omega e$ increases to reach to a third predetermined value $\omega e1$ or before a value less than $\omega e1$. It is noted that the engine rotation speed $\omega e$ is obtained by the engine rotation speed sensor 11e. The engine rotation acceleration speed is the change amount of the engine rotation speed per unit of time and is derived from the engine rotation speed $\omega e$ which is obtained by the engine rotation speed sensor 11e.

The second predetermined value $\alpha e1$ is the engine rotation acceleration speed corresponding to the driving force difference between a randomly selected speed change stage at the vehicle speed (output shaft rotation speed) corresponding to the speed change point where the upshifting is performed from the randomly selected speed change stage and the upshifted speed change stage. In other words, the second predetermined value $\alpha e1$ is a value of an engine rotation acceleration speed corresponding to the difference Fa in driving force between the second speed driving force and the third speed driving force corresponding to the engine rotation speed at the output shaft rotation speed $\omega o2$ corresponding to the speed change performance point AU2→3 when the speed is upshifted from the second to third as shown in FIG. 3. The difference Fa in the driving force is an excess driving force at the output shaft rotation speed $\omega o2$ and corresponds to the difference between the second speed driving force and the third speed driving force. A dotted line which indicates the running resistance on the 7% inclination uphill intersects at the point C (on the performance line of output shaft rotation speed $\omega o2$) with the third speed driving force performance line. Accordingly, the third speed driving force on the line of the output shaft rotation speed $\omega o2$ is equal to the running resistance on the 7% inclination uphill.

The second predetermined value $\alpha e1$ is represented by the formula M1 below.

$$\alpha e1 = Fa/(Ma \cdot i \cdot c) \tag{M1}$$

Wherein Fa represents the difference in driving force (=excess driving force=Driving force—running resistance), Ma represents the vehicle mass of the vehicle M, "i" represents the total reduction gear ratio of the vehicle M (=the speed change ratio of the automatic transmission 12× final reduction gear ratio of the differential device 14) and "c" represents the efficiency of transmission.

The formula M1 can be calculated as follows, wherein assuming that the acceleration speed of the vehicle M is $2a''$, the angular acceleration speed (rotation acceleration speed) of a drive wheel is at, and that the effective radius of the drive wheel is "r", the excess driving force Fa can be represented by the formula M2 as follows.

$$Fa = Ma \cdot ``a'' \tag{M2}$$

Further, since the acceleration speed "a" of the vehicle M is represented as effective radius "r"×angular acceleration speed at of the drive wheel, the excess driving force Fa can be represented by the formula M3 as follows.

$$Fa = Ma \cdot ``r'' \cdot \alpha t \tag{M3}$$

On the other hand, the relationship between the rotation acceleration speed "$\alpha t$" of the drive wheel and the engine rotation acceleration speed $\alpha e$ is represented by the formula M4 below.

$$\alpha t : \alpha e = (i \cdot c)/r : 1 \tag{M4}$$

The engine rotation acceleration speed $\alpha e$ can be represented as indicated by the formula M5 from the formula M4.

$$\alpha e = (r/(i \cdot c)) \cdot \alpha t \tag{M5}$$

By substituting the formula M3 into the formula M5, the engine rotation acceleration speed $\alpha e$ can be represented by the following formula M6 using excess driving force Fa, vehicle mass Ma, total reduction gear ratio "i" and transmission efficiency "c".

$$\alpha e = (r/(i \cdot c)) \cdot Fa/(Ma \cdot r)$$

$$= Fa/(Ma \cdot ``i'' \cdot c) \tag{M6}$$

In order to accurately calculate the vehicle mass, it is preferable to add the inertia mass of the rotational part as an equivalent mass to the vehicle mass. In more detail, instead of using the vehicle mass Ma in the above formulae, the value Ma (1+"ϵ"). The value "ϵ" is represented as ϵ=equivalent mass (ΔM) of the rotational part/vehicle mass Ma.

The third predetermined value $\omega e1$ is set to be a value smaller than the engine rotation speed by which the maximum torque is generated at every speed change stage. As will be explained in detail, it is necessary to accurately obtain maximum engine torque. Accordingly, the start timing of upshifting prohibition mode is necessary to be set to the time before the maximum engine torque is generated, i.e., to the time before the engine rotation speed reaches to the speed which generates the maximum torque of the speed change stage. If the starting time for upshifting prohibition mode is set after the maximum engine torque is generated, accurate maximum engine torque cannot be obtained. For example, if the speed change stage is the second speed, the maximum engine torque is generated at the engine speed of 4000 rpm, the third predetermined value $\omega e1$ is set to the rotation speed corresponding to such as 3500 rpm.

When the engine rotation acceleration speed is equal to or less than the second predetermined value $\alpha e1$ and the engine rotation speed is equal to or less than the third predetermined value $\omega e1$, the automatic transmission ECU 22 judges "YES" at the step S110 and starts upshifting prohibition mode at the step S114. Thereafter the program goes to the step S116 and ends the program.

On the other hand, when the engine rotation acceleration speed is greater than the second predetermined value $\alpha e1$ or the engine rotation speed exceeds the third predetermined value $\omega e1$, the automatic transmission ECU 22 judges "NO" at the step S110 and continues the normal mode at the step S112. Thereafter the program goes to the step S116 and ends the program.

When the automatic transmission ECU 22 judges that the upshifting is prohibited (YES) at the step S104, the program goes to the step S118 to prohibit the upshifting operation and then goes to the step S120 and the automatic transmission ECU 22 controls the engine 11 to maintain the rotation speed (rpm) thereof to the set value $\omega ea$. This set value $\omega ea$ is set to be smaller than the engine rotation speed of the speed change point of the current speed change stage (corresponding to the output shaft rotation speed $\omega o2$). In this embodiment, the set value $\omega ea$ is set to correspond to 4450 rpm.

At the step S122, the automatic transmission ECU 22 calculates the maximum engine torque in the time from the engine rpm at the start of upshifting prohibition mode up to the current engine rpm. In detail, by comparing the maximum torque recorded in the memory portion (not shown) with the current engine torque the automatic transmission ECU 22 records the larger one as the new maximum torque. It is noted that the current engine torque may be obtained from the engine ECU 21 or may be obtained by using a map which indicates the co-relationship among the acceleration opening degree A, the engine rotation speed $\omega e$, the engine rotation speed per every acceleration opening degree and the engine torque.

The automatic transmission ECU 22 judges whether the torque difference between the maximum engine torque and the current engine torque is larger than a predetermined torque value Te1 at the step S124. The engine maximum torque is the value recorded at the step S122. The current engine torque is the value obtained at the step S122. The predetermined torque value Te1 corresponds to the difference in the driving force between the driving forces at a randomly selected speed change stage and at the upshifted speed change stage therefrom at the vehicle speed (output shaft rotation speed) corresponding to the speed change upshifting performance point from the randomly selected speed change stage, as explained in the description of the step S110.

As shown in FIG. 3, the predetermined torque value Te1 is the value corresponding to the difference Fa in driving force between the second speed driving force and the third speed driving force at the output shaft rotation speed $\omega o2$ corresponding to the upshifting speed change point AU2→3 from the second speed to the third speed. For example, when the vehicle M is running on an uphill of 9% inclination, in other words, when the torque difference is less than the driving force difference Fa, if the upshifting is performed from the current speed stage (for example the second speed), the running resistance on the uphill of 9% inclination becomes larger than the third speed driving force and the excess driving force becomes zero which may lead to the vehicle speed reduction. However, if the vehicle is running on the uphill of 5% inclination, in other words, when the torque difference is greater than the driving force difference Fa, if the upshifting is performed from the current speed stage (for example the second speed), the third speed driving force becomes larger than the running resistance on the uphill of 5% inclination and the excess driving force can be sufficiently assured not to worry about the vehicle speed reduction.

At the step S110, the judgment of starting of upshifting prohibition mode is made based on the engine rotation acceleration speed, while at the step S124, the judgment of releasing of upshifting prohibition mode is made based on the engine torque. This is because the engine acceleration speed becomes zero due to the maintaining control of the engine rotation speed to the predetermined value $\omega ea$ during the upshifting prohibition mode operation. The engine rotation speed cannot be a factor of judgment.

When the torque difference between the engine maximum torque and the current engine torque is greater than the predetermined torque value Te1, the automatic transmission ECU 22 judges to be "YES" at the step S124 and releases the upshifting prohibition mode. Accordingly, the normal mode starts thereafter (at the step S128). The program goes to the step S116 to temporarily end the program and returns to the Start S100 for another loop.

On the other hand, if the torque difference between the engine maximum torque and the current engine torque is equal to or smaller than the predetermined torque value Te1, the automatic transmission ECU 22 judges to be "NO" at the step S124 and continues the upshifting prohibition mode. Thereafter the program goes to the step S116 to temporarily end the program.

Figure 5:
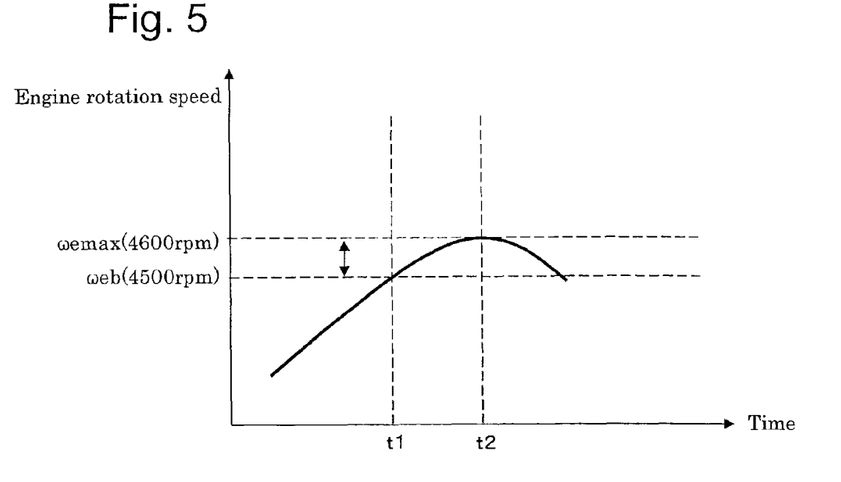
FIG. 5 is a time chart explaining the upshifting operation during the normal mode.

Next, the operation under normal mode of the control device will be explained with reference to the time chart in FIG. 5 and operation explanation graph in FIG. 6. During the normal mode, the upshifting of the speed change stage is allowed. In more detail, when the acceleration opening degree A is less than the first predetermined value A1 (90% according to the embodiment), the upshifting operation is performed based on the output shaft rotation speed detected by the output shaft rotation speed sensor 12*d*, the throttle opening degree detected by the throttle opening degree sensor 11*d* and the speed change performance lines for upshifting and downshifting.

On the other hand, when the acceleration opening degree A is equal to or more than the first predetermined value A1, the upshifting operation is performed based on the engine rotation speed detected by the rotation speed sensor 11*e*. In other words, upshifting of speed change stage is controlled to be performed at a predetermined engine rotation speed $\omega emax$.

The predetermined engine rotation speed "ωemax" is the maximum rotation speed of the engine 11 (for example, the rotation speed corresponding to 4,600 rpm) and is the value corresponding to the output shaft rotation speed (vehicle speed) at which the driving force of each speed change stage is sharply reduced. It is noted that the time t2, which is the timing of the engine rotation speed becoming the value ωemax, the hydraulic pressure is changed for shifting from the speed stage before shifting of the speed change stage (previous speed stage) to the speed stage after shifting (following speed change).

Further, as shown in FIG. 6, the engine rotation speed ωeb corresponding to each speed change point AU1→2, U2→3, AU3→4, AU4→5 and AU5→6 (hereinafter referred to as speed change point engine rotation speed) is set to a value smaller than the maximum rotation speed of the engine 11 (for example, the rotation speed corresponding to 4,500 rpm). The speed change engine rotation speed ωeb is calculated by the equation of (ωeb=maximum engine rotation speed—engine rotation acceleration speed×time necessary for speed change operation). The time necessary for speed change operation is defined by the time from the start of speed change operation to the time the hydraulic pressure for shifting from the speed change stage before the speed change operation (previous speed stage) to the speed change stage after speed change operation (following speed change) changes. In FIG. 5, the necessary time for speed change operation is defined to be the time between the time t1 that the starting instruction for upshifting is made and the time t2.

Further, in the normal mode operation, the maintaining of the engine rotation speed to the value ωea executed at the step S120 is released and normal engine control is made. In other words, the output of the engine 11 is controlled according to the opening degree of the accelerator pedal 15 (depression or operating amount of the pedal).

Further operation of the control device when the acceleration opening degree A is equal to or more than the first predetermined value A1 will be explained with reference to the map in FIG. 6. The vehicle M is running with acceleration at the first speed stage and when the output shaft rotation speed is less than the value ωob1 which corresponds to the speed change point AU1 to 2, the vehicle M continues to run at the first speed stage. However, when the output shaft rotation speed reaches to the point AU1 to 2 the automatic transmission ECU outputs instructions to start upshifting operation from the first to the second speed. At the output shaft rotation speed ωomax1, the upshifting is performed and the transmission is upshifted to the second speed stage. Then the vehicle M starts to be running at the second speed stage and when the output shaft rotation speed is less than the value ωob2 which corresponds to the speed change point AU2→3, the speed change stage is kept to be the second. However, when the output shaft rotation speed reaches to the point AU2→3, the automatic transmission ECU outputs instructions to start upshifting operation from the second to the third speed. At the output shaft rotation speed ωomax2, the upshifting is performed and the transmission is upshifted to the third speed stage.

Similarly, when the output shaft rotation speed reaches to the point AU3→4, the automatic transmission ECU outputs instructions to start upshifting operation from the third to the fourth speed. At the output shaft rotation speed ωomax3, the upshifting is performed and the transmission is upshifted to the fourth speed stage. When the output shaft rotation speed reaches to the point AU4→5, the automatic transmission ECU outputs instructions to start upshifting operation from the fourth to the fifth speed. At the output shaft rotation speed ωomax4, the upshifting is performed and the transmission is upshifted to the fifth speed stage. When the output shaft rotation speed reaches to the point AU5→6, the automatic transmission ECU outputs instructions to start upshifting operation from the fifth to the sixth speed. At the output shaft rotation speed ωomax5, the upshifting is performed and the transmission is upshifted to the sixth speed stage. It is noted that each of the output shaft rotation speed values ωomax1, ωomax2, ωomax3, ωomax4 and ωomax5 corresponds to each of the engine maximum rotation speed ωemax and that each of the output shaft rotation speed values ωob1 through ωob5 corresponds to the engine rotation speed at each speed change point web.

Figure 7:
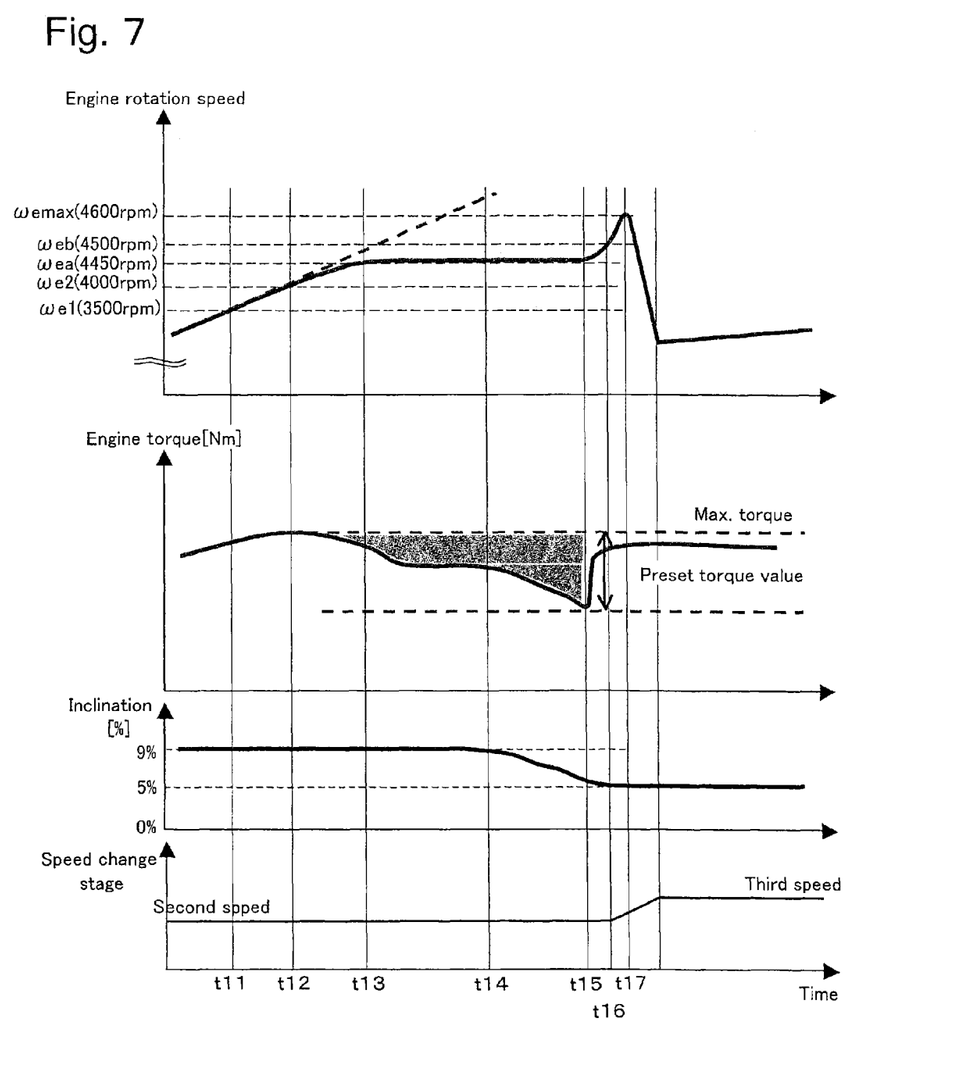
FIG. 7 is a time chart explaining the operation mainly during upshifting prohibiting mode.

Further operation of the control device under upshifting prohibition mode will be explained with reference to the time chart in FIG. 7. In FIG. 7, top portion indicates the engine rotation speed, second portion from the top indicates the engine torque and the lower portion indicates the speed change stage. In this operation, the upshifting operation is prohibited. For example, when the vehicle m is running with acceleration at the second speed stage on an uphill with inclination of 9%. Under this situation, when the acceleration opening degree A is equal to or more than the first predetermined value A1 and the engine rotation acceleration speed αe is equal to or less than the second predetermined value αe1 and further when the engine rotation speed we reaches to the third value ωe1 (at the time t11 in FIG. 7), the upshifting prohibition mode starts (at the step S114 in the flow chart in FIG. 4) and the upshifting prohibition is performed (at the step S118 in FIG. 4). Thereafter, the engine rotation speed we is controlled to be maintained to the predetermined value ωea (at the step S120: start of feedback control). It is noted that according to the embodiment illustrated in FIG. 7, the upshifting is prohibited when the engine rotation speed we reaches to the third predetermined value ωe1 (3,500 rpm). However, the upshifting operation may be prohibited before the engine speed ωe reaches to the third value, on the condition that other values, such as, the acceleration opening degree A and the engine rotation acceleration speed αe, satisfy the condition of prohibition of upshifting.

At the time t12, when the engine rotation speed we reaches to the rotation speed wet (4000 rpm), the engine 11 generates the maximum torque. Further, at the time t13, the engine 11 begins to be controlled to rotate with the predetermined rotation speed ωea. After the time t13 until the upshifting prohibition mode is released, the engine rotation speed is kept to be the predetermined value ωea. Since the vehicle M is running on the uphill with inclination of 9% with the acceleration with the engine rotation speed of ωea at the second speed stage, the second speed driving force performance line still has an excess driving force with respect to the running resistance of the 9% inclination uphill road.

At the time t14, when the road inclination is gradually decreased from 9% to 5% inclination, since the rotation speed of the engine 11 is feedback controlled, the engine torque is gradually decreased which increases the excess driving force. Thereafter, at the time t15, the difference in torque between the engine maximum torque and the current engine torque becomes greater than the predetermined difference value Te1 and then the upshifting prohibition mode is released to return to the normal mode (at the step S128).

When the normal mode operation starts, at the time t15, the maintaining of the engine rotation speed to the value ωea is also released (at the step S106). The engine rotation speed is controlled so that the upshifting of the transmission is performed at the predetermined engine rotation speed ωemax. In other words, when the engine rotation speed reaches to the speed change point rotation speed $\omega eb$ at the time t16, the upshifting from the second speed to the third begins to start. After the time necessary for changing speed stage passed (from time t16 to the time t17), the engine rotation speed reaches to the $\omega emax$ to thereby performing the upshifting from the second to the third speed stage.

The operation of the case that does not have the upshifting prohibition mode will be explained with reference to FIG. 6. When the vehicle M with maximum allowable load thereon is running on an uphill with for example 9% inclination at the second speed in full throttle opening (the acceleration opening degree A is 90% or more) by fully depressing the accelerator pedal 15, the driving force at the second speed is greater than the running resistance on the 9% uphill road, the vehicle M is accelerated. Thereafter, in order to prevent an over-revolution of the engine, the upshifting of the transmission to the third speed stage is performed at the output shaft rotation speed, i.e., the vehicle speed immediately before the driving force being suddenly decreased (the speed generating over-revolution at the second speed change stage). However, the driving force at the third speed is smaller than the running resistance at the 9% inclination uphill, the vehicle is decelerated even the accelerator pedal 15 is fully depressed. Thereafter when the vehicle is decelerated to a certain vehicle speed (satisfies the downshifting condition), the downshifting to the second speed is performed. The repetition of such up-down shifting may generate undesired hunting phenomenon as shown in FIG. 6 with one dot dashed line.

According to a first aspect of the embodiment of the invention, the control device (automatic transmission ECU 22) for the vehicle M includes an engine 11 operated by combustion of fuel, an automatic transmission 12 having a plurality of speed change stages (first to sixth forward speed stages and one reverse speed stage) for outputting an output rotation of the engine to an output shaft by changing a rotation speed thereof with a plurality of gear ratios, whereby an upshifting or a downshifting of the plurality of speed change stages is performed to increase or decrease an output rotation speed of the output shaft when one of the speed change stages is shifted to another of the speed change stages and an accelerator pedal for adjusting the output rotation of the engine. The control device comprises an upshifting prohibiting portion (S118) for prohibiting the upshifting of the plurality of speed change stages when an opening degree A of the accelerator pedal 15 is equal to or more than a first predetermined value A1 and an engine rotation acceleration speed ($\alpha e$) is less than a second predetermined value ($\alpha e1$), an engine rotation speed maintaining portion (S120) for maintaining an engine rotation speed ($\omega e$) to a predetermined rotation speed ($\omega ea$) when the upshifting of the plurality of speed change stages is prohibited (time t11 to time t15) by the upshifting prohibiting portion, an engine maximum torque value recording portion (S122) for recording a maximum torque value of the engine when the upshifting of the plurality of speed change stages is prohibited by the upshifting prohibiting portion and an upshift prohibition releasing portion (S128) for releasing an upshift prohibition by the upshifting prohibiting portion when a differential torque value which is a difference between the maximum torque value of the engine recorded by the engine maximum torque value recording portion and a current engine torque value is greater than a predetermined torque value Te1 when the upshifting of the plurality of speed change stages is prohibited by the upshifting prohibiting portion.

Conventionally when a vehicle M is running with a driving force at the second speed which is smaller than the running resistance received on an uphill road, the vehicle is running in full throttle and the engine rotation acceleration speed is relatively small compared to the opening degree of the accelerator pedal 15, the upshifting is normally performed to prevent excess revolution of the engine. This may sometimes generate transmission hunting phenomenon. However, according to the first aspect of thus structured control device for a vehicle of the above embodiment of the invention, even under the accelerator pedal 15 being fully depressed, if the engine rotation acceleration speed is relatively small compared to the opening degree of the accelerator pedal, the control device presumes that the vehicle driving force would be insufficient against the running resistance received by the vehicle after the upshifting and prohibits the upshifting operation and at the same time maintains the engine rotation speed to a predetermined rotation speed. Accordingly, when the vehicle is running on an uphill with a running resistance smaller than the driving force at the second speed, although the accelerator pedal 15 is fully depressed but the engine acceleration speed is smaller than the opening degree of the accelerator pedal 15, the upshifting is prohibited to avoid occurrence of hunting in a vehicle running on an uphill with the accelerator pedal 15 in full opening furthermore, by suppressing the occurrence of the hunting, necessary driving force can be obtained to prevent over revolution of the engine. Still further, when the upshifting is prohibited by the upshifting prohibiting portion, if the difference in torque between the engine maximum allowable torque and the current engine torque at the time is larger than the predetermined torque value Te1, the control device judges that the vehicle driving force is sufficient against the running resistance and appropriately releases the prohibition of upshifting.

According to a second aspect of the embodiment of the invention, the control device includes the upshifting prohibiting portion (S118) which prohibits the upshifting of the plurality of speed change stages when the opening degree A of the accelerator pedal 15 is equal to or more than the first predetermined value A1, the engine rotation acceleration speed is less than the second predetermined value $\alpha e1$ and the engine rotation speed is equal to or less than a third predetermined value wet. According to this second aspect of the embodiment, the condition of prohibiting the upshifting operation includes that the engine rotation speed is equal to or less than the third predetermined value $\omega e1$ in addition to the condition that the accelerator pedal 15 opening degree A is equal to or more than the first predetermined value A1 and that the engine rotation acceleration speed is smaller than the second predetermined value $\alpha e1$. Accordingly, by setting the third predetermined value $\omega e1$ to be a value smaller than the engine rotation speed where the maximum torque is generated, the engine maximum torque value recording portion surely obtains the maximum torque at each speed change stage. Thus the releasing of prohibition of upshifting can be accurately and properly made by the upshift prohibition releasing portion.

According to a third aspect of the embodiment of the invention, the vehicle speed and driving force performance characteristic of the vehicle is set so that each driving force in each speed change stage is sharply decreased at a vehicle speed set according to an engine allowable rotation speed. According to this third aspect of the embodiment, the driving force at each speed change stage is set to be sharply decreased at a vehicle speed set in response to the engine allowable rotation speed (for example, the speed corresponding to the output shaft rotation speed of $\omega omax1$ to $\omega omax5$). Thus, the hunting of the transmission at shifting can be surely avoided for a vehicle having a special vehicle speed and driving force performance characteristic or for a vehicle running on an uphill in full throttle.

According to a fourth aspect of the embodiment of the invention the upshifting of the each speed change stage is performed based on the engine rotation speed. According to the structure of the fourth aspect above, when the vehicle speed and driving force performance characteristic is set so that the driving force at each speed change stage is sharply reduced at the vehicle speed set in response to the engine allowable rotation speed, over revolution of the engine may be occurred due to the shifting operation performed based on the speed change performance line (indicated as the relationship between the vehicle speed and the acceleration opening degree). However, according to the structure of the fourth aspect above, the upshifting operation is performed based on the engine rotation speed to prevent over revolution of the engine.

According to the fifth aspect of the embodiment, the second predetermined value $\alpha e1$ is the engine rotation acceleration speed corresponding to a difference in the driving force between a randomly selected speed change stage and an upshifted speed change stage, in a vehicle speed corresponding to a speed change point upshifted from the randomly selected speed change stage among the plurality of speed change stages. According to the fifth aspect of the embodiment above, the prohibition of upshifting can be accurately and properly made by presuming that the vehicle driving force is sufficient or not relative to the running resistance.

According to the sixth aspect of the embodiment of the invention, the predetermined torque value Te1 is a torque value corresponding to a difference in the driving force between a randomly selected speed change stage and an upshifted speed change stage, in a vehicle speed corresponding to a speed change point upshifting from the randomly selected speed change stage among the plurality of speed change stages. According to the sixth aspect of the embodiment above, when the upshifting is prohibited, the control device accurately and properly judges whether the vehicle driving force is sufficient against the running resistance or not to accurately and properly release the prohibition of upshifting.

It is noted that in the embodiment explained above, at the step S110 the automatic transmission ECU 22 judges whether the engine rotation acceleration speed $\alpha e$ is equal to or less than the second predetermined value $\alpha e1$ and whether the engine rotation speed we is equal to or less than the third predetermined value $\omega e1$. However, the judgment may be made for only one condition whether the engine rotation acceleration speed $\alpha e$ is equal to or less than the second predetermined value $\alpha e1$. According to this judgment when the opening degree of the accelerator pedal is equal to or more than the first predetermined value and the engine rotation acceleration speed$\alpha e$ is equal to or less than the second predetermined value $\alpha e1$, the upshifting prohibiting mode can be started.

Obviously, numerous modifications and variations of the present invention are possible in light of the above teachings. It is therefore to be understood that within the scope of the appended claims, the present invention may be practiced otherwise than as specifically described herein.

What we claim is:

1. A control device for a vehicle comprising an engine operated by combustion of fuel, an automatic transmission having a plurality of speed change stages for outputting an output rotation of the engine to an output shaft by changing a rotation speed thereof with a plurality of gear ratios, whereby an upshifting or a downshifting of the plurality of speed change stages is performed to increase or decrease an output rotation speed of the output shaft when one of the speed change stages is shifted to another of the speed change stages and an accelerator pedal for adjusting the output rotation of the engine, the control device comprising:
   an upshifting prohibiting portion for prohibiting the upshifting of the plurality of speed change stages when an opening degree of the accelerator pedal is equal to or more than a first predetermined value and an engine rotation acceleration speed is less than a second predetermined value;
   an engine rotation speed maintaining portion for maintaining an engine rotation speed to a predetermined engine rotation speed when the upshifting of the plurality of speed change stages is prohibited by the upshifting prohibition portion:
   an engine maximum torque value recording portion for recording a maximum torque value of the engine when the upshifting of the plurality of speed change stages is prohibited by the upshifting prohibition portion; and
   an upshifting prohibition releasing portion for releasing an upshifting prohibition by the upshifting prohibiting portion when a differential torque value which is a difference between the maximum torque value of the engine recorded by the engine maximum torque value recording portion and a current engine torque value is greater than a predetermined torque value when the upshifting of the plurality of speed change stages is prohibited by the upshifting prohibiting portion.

2. The control device for a vehicle according to claim 1, wherein the upshifting prohibiting portion prohibits the upshifting of the plurality of speed change stages when the opening degree of the accelerator pedal is equal to or more than the first predetermined value, the engine rotation acceleration speed is less than the second predetermined value and the engine rotation speed is equal to or less than a third predetermined value.

3. The control device for a vehicle according to claim 1, wherein a vehicle speed and driving force performance characteristic of the vehicle is set so that each driving force in each speed change stage is sharply decreased at a vehicle speed set according to an engine allowable rotation speed.

4. The control device for a vehicle according to claim 1, wherein the upshifting of the each speed change stage is performed based on the engine rotation speed.

5. The control device for a vehicle according to claim 1, wherein the second predetermined value is the engine rotation acceleration speed corresponding to a difference in the driving force between a randomly selected speed change stage and an upshifted speed change stage, in a vehicle speed corresponding to a speed change point upshifted from the randomly selected speed change stage among the plurality of speed change stages.

6. The control device for a vehicle according to claim 1, wherein the predetermined torque value is a torque value corresponding to a difference in the driving force between a randomly selected speed change stage and an upshifted speed change stage, in a vehicle speed corresponding to a speed change point upshifted from the randomly selected speed change stage among the plurality of speed change stages.

* * * * *